US012617701B2

(12) United States Patent
Gupta et al.

(10) Patent No.: US 12,617,701 B2
(45) Date of Patent: May 5, 2026

(54) USE OF A CHLORINE DIOXIDE PRECURSOR FOR CONTROLLING ION METABOLISM OF BACTERIA IN COOLING WATER SYSTEMS

(71) Applicant: ECOLAB USA Inc., St. Paul, MN (US)

(72) Inventors: Amit Gupta, Aurora, IL (US); David Hardie Rodman, Townsville (AU); Fritz Earwin Perez Monterozo, Muntinlupa City (PH); Dinesh Balkisan Mantri, Pune (IN); Tomy Suryatama, Depok (ID); Fajar Muhammad Rahman, Serpong (ID); Achmad Syah, Depok (ID); Nugraha Yohannes Arifpin, Tangerang Selatan (ID)

(73) Assignee: ECOLAB USA Inc., St. Paul, MN (US)

( * ) Notice: Subject to any disclaimer, the term of this patent is extended or adjusted under 35 U.S.C. 154(b) by 588 days.

(21) Appl. No.: 18/070,362

(22) Filed: Nov. 28, 2022

(65) Prior Publication Data

US 2023/0183111 A1 Jun. 15, 2023

Related U.S. Application Data

(60) Provisional application No. 63/418,147, filed on Oct. 21, 2022, provisional application No. 63/285,234, filed on Dec. 2, 2021.

(51) Int. Cl.
*C02F 1/76* (2023.01)
*C02F 1/72* (2023.01)
(Continued)

(52) U.S. Cl.
CPC ................ *C02F 1/76* (2013.01); *C02F 1/722* (2013.01); *C02F 2101/38* (2013.01);
(Continued)

(58) Field of Classification Search
CPC .... C02F 2209/15; C02F 2209/19; C02F 1/76; C02F 1/722; C02F 2101/38
See application file for complete search history.

(56) References Cited

U.S. PATENT DOCUMENTS 4,681,739 A 7/1987 Rosenblatt et al.
5,116,759 A * 5/1992 Klainer ................ G01N 21/253
436/119

(Continued)

FOREIGN PATENT DOCUMENTS

CN 104671433 B 7/2016
CN 105800842 B 3/2019
(Continued)

OTHER PUBLICATIONS

Bonete, María-José & Bautista, Vanesa & Esclapez, Julia & García-Bonete, Maria-Jose & Pire, Carmen & Camacho, Mónica & Torregrosa-Crespo, Javier & Martínez-Espinosa, Rosa. (2015). New Uses of Haloarchaeal Species in Bioremediation Processes. 10.5772/60667.

(Continued)

*Primary Examiner* — Ryan B Huang
*Assistant Examiner* — Adam Adrien Germain
(74) *Attorney, Agent, or Firm* — Eric D. Babych; Barnes & Thornburg LLP

(57) ABSTRACT

A method of reducing activity of sulfur and/or nitrogen metabolizing bacteria is provided. The method includes adding a composition of an alkali metal salt of chlorite and/or an alkali metal salt of chlorate and hydrogen peroxide to process water of a cooling tower and increasing a concentration of the composition from about 0 ppm to about 300 ppm in about 1 to about 100 minutes.

12 Claims, 9 Drawing Sheets

(51) Int. Cl.
*C02F 101/38* (2006.01)
*C02F 103/02* (2006.01)
(52) U.S. Cl.
CPC .... *C02F 2101/40* (2013.01); *C02F 2103/023* (2013.01); *C02F 2303/04* (2013.01)

(56) References Cited

U.S. PATENT DOCUMENTS

| | | | |
|---|---|---|---|
| 5,618,440 A | 4/1997 | Mason | |
| 5,922,776 A | 7/1999 | Wellinghoff et al. | |
| 7,128,879 B1 * | 10/2006 | Hunt | C02F 1/76 |
| | | | 422/106 |
| 7,491,331 B2 | 2/2009 | Rittmann et al. | |
| 2002/0139750 A1 | 10/2002 | Boyce | |
| 2003/0200997 A1 | 10/2003 | Gill et al. | |
| 2019/0055146 A1 * | 2/2019 | Xiong | C02F 1/686 |
| 2019/0365939 A1 | 12/2019 | McGinnis et al. | |
| 2020/0017386 A1 * | 1/2020 | Takahashi | C02F 3/006 |
| 2020/0172409 A1 * | 6/2020 | Trujillo | C02F 1/008 |
| 2021/0317014 A1 * | 10/2021 | Baron | C02F 1/76 |
| 2021/0340044 A1 | 11/2021 | Luke et al. | |
| 2021/0352905 A1 | 11/2021 | Almås et al. | |

FOREIGN PATENT DOCUMENTS

| | | |
|---|---|---|
| CN | 113072251 A | 7/2021 |
| EP | 3255016 A1 | 12/2017 |

OTHER PUBLICATIONS

Carvajal-Arroyo, J. M., Sun, W., Sierra-Alvarez, R., & Field, J. A. (2013). Inhibition of anaerobic ammonium oxidizing (anammox) enrichment cultures by substrates, metabolites and common wastewater constituents. Chemosphere, 91(1), 22-27. https://doi.org/10.1016/j.chemosphere.2012.11.025.

Féray, C., & Montuelle, B. (2003). Chemical and microbial hypotheses explaining the effect of wastewater treatment plant discharges on the nitrifying communities in freshwater sediment. Chemosphere, 50(7), 919-928. https://doi.org/10.1016/s0045-6535(02)00646-x.

Moroz, O.M. et al. (2021). Nitrite oxidation by phototrophic bacteria of Chlorobium, Thiocapsa and Lamprocystis genera under the influence of inorganic pollutants. Biosystems Diversity, 29(1), 39-46. https://doi.org/10.15421/012106.

Provisional Opinion Accompanying the Partial Search Result for International Application No. PCT/US2022/051105, mailed Apr. 17, 2023, 8 pages.

Rusmana, I., & Nedwell, D. B. (2004). Use of chlorate as a selective inhibitor to distinguish membrane-bound nitrate reductase (Nar) and periplasmic nitrate reductase (Nap) of dissimilative nitrate reducing bacteria in sediment. FEMS microbiology ecology, 48(3), 379-386. https://doi.org/10.1016/j.femsec.2004.02.010.

Van Wijk, D. J., Kroon, S. G., & Garttener-Arends, I. C. (1998). Toxicity of chlorate and chlorite to selected species of algae, bacteria, and fungi. Ecotoxicology and environmental safety, 40(3), 206-211. https://doi.org/10.1006/eesa.1998.1685.

* cited by examiner

USE OF A CHLORINE DIOXIDE PRECURSOR FOR CONTROLLING ION METABOLISM OF BACTERIA IN COOLING WATER SYSTEMS

CROSS-REFERENCES TO RELATED APPLICATIONS

This application claims the benefit of U.S. Provisional Application No. 63/418,147, filed Oct. 21, 2022, and U.S. Provisional Application No. 63/285,234, filed Dec. 2, 2021, the entire disclosure of each of which is incorporated herein by reference.

BACKGROUND

1. Field of the Invention

The present disclosure generally relates to controlling ion metabolism of bacteria in cooling water systems.

2. Description of the Related Art

Bacteria in process waters are capable of utilizing different inorganic and organic matter as sources of nutrition or energy. For example, sulfate reducing bacteria utilize sulfate and reduce it to form sulfite, which is further metabolized by different microorganisms to form sulfide ($H_2S$) and subsequently can result in the formation of sulfurous acid and sulfuric acid. The formation of these species can result in corrosion. Also, the formed sulfite ions consume any oxidizing biocide and are oxidized to form sulfate ions, thus recreating the food source for the microorganism that formed the sulfite or reducing agent. Similarly, different nitrogen metabolizing bacteria can result in the formation of a nitrite species that acts as a reductant to consume the oxidizing biocide.

In both of these examples, the presence of microorganisms results in the formation of a reducing species that consumes the biocide and reduces its efficacy. As a result, adequate amounts of the biocide are not available to control microbial populations, which are able to proliferate and present more demand in the form of organic matter and increased metabolic byproducts.

These problems can occur in, for example, freshwater and/or seawater open recirculating systems as well as geothermal cooling water systems.

Geothermal energy is energy in the form of heat within the earth's interior, which is tapped by geothermal wells. Geothermal energy moves towards the earth's surface by thermal conduction through solid rock. Thermal energy can also be transmitted towards the earth's surface by movement of molten rock or by circulation of fluid ($H_2O$ as steam or water) through interconnected fractures and pores, which may provide heat reservoirs closer to the surface, and thus a site more accessible to drilling for wells to tap geothermal energy.

Natural geothermal reservoirs, on which many commercial geothermal wells are located, comprise volumes of rock at high temperatures (up to about 350° C. or 622° F.) and often also of high porosity and high permeability to fluids. Wells are drilled into such a reservoir and the thermal energy in the rock is transferred by conduction to a fluid ($H_2O$ as water or steam), which subsequently flows to the well and then up to the earth's surface. In areas where the rock has a low porosity and permeability, it must be artificially fractured by means of explosives or hydrofracturing to provide a network of such fractures, commonly known as Enhanced Geothermal Systems (EGS).

Geothermal cooling systems that include contact condensers or use geothermal condensate as make-up water have a unique challenge for the proliferation of sulfur metabolizing bacteria and nitrogen metabolizing bacteria. Similar challenges may also be presented in other industrial water systems, such as cooling water systems. Reduced sulfur and nitrogen ionic species in the system are being assimilated by the bacteria as sources of energy and produce unwanted by-products, such as sulfuric acid and intermediate by-products. If left uncontrolled, the bacterial activity can cause the prevailing pH of the cooling water system to be significantly reduced.

BRIEF SUMMARY

A method of reducing activity of a bacteria, such as an oxidizing bacteria, is provided. The method includes adding a composition comprising an alkali metal salt of chlorite and/or an alkali metal salt of chlorate and hydrogen peroxide, to a process water of a cooling water system and increasing a concentration of the composition from about 0 ppm to about 300 ppm in about 1 to about 100 minutes. The process water comprises sulfur metabolizing bacteria, such as sulfur oxidizing bacteria, and/or nitrogen metabolizing bacteria. The term "metabolizing" covers all types of bacteria that can use any form of the ion, including oxidizing bacteria and reducing bacteria, such as sulfate reducing bacteria or a denitrifier that would reduce a nitrate to a nitrite, for example.

In some aspects, the concentration of the composition increases from about 0 ppm to about 300 ppm in less than about 15 minutes.

In some aspects, the concentration of the composition is increased from about 0 ppm to about 200 ppm.

In some aspects, the concentration of the composition is increased from about 0 ppm to about 150 ppm.

In some aspects, the method further includes decreasing a conductivity of the process water after adding the composition.

In some aspects, the method further includes decreasing a sulfate, a nitrite, and/or a nitrate concentration in the process water after adding the composition.

In some aspects, the method further includes increasing a pH of the process water after adding the composition.

In some aspects, the method further includes measuring a first sulfate, a first nitrite, and/or a first nitrate concentration in the process water at a position at or near a bottom of a cooling tower basin.

In some aspects, the method further includes measuring a second sulfate, a second nitrite, and/or a second nitrate concentration in the process water at a position at or near a surface of the process water.

In some aspects, the method further includes calculating a sulfate, a nitrite, and/or a nitrate concentration difference between the first sulfate, the first nitrite, and/or the first nitrate concentration and the second sulfate, the second nitrite, and/or the second nitrate concentration.

In some aspects, the composition is added to the process water when the sulfate, nitrite, and/or nitrate concentration difference is from about 3 to about 20 ppm.

In some aspects, the composition is added to the process water when the sulfate, the nitrite, and/or the nitrate concentration difference is from about 4 to about 6 ppm.

In some aspects, the composition comprises about 5 wt % to about 60 wt % of the alkali metal salt of chlorate and about 0.5 wt % to about 30 wt % of the hydrogen peroxide. In some embodiments, the composition comprises about 5 wt % to about 60 wt % of an alkali metal salt of chlorite.

In some aspects, the cooling system includes a direct contact condenser.

In some aspects, the cooling system comprises high sulfur and/or nitrogen species oxidizing or reducing bacteria activity before addition of the composition.

In some aspects, the process water comprises sulfuric or nitric acid produced from the sulfur or nitrogen metabolizing bacteria.

In other aspects, a system for controlling sulfur and/or nitrogen based deposition and sulfur and/or nitrogen metabolizing bacteria is provided. The system includes a controller configured to receive data provided by a first sulfate, nitrite, and/or nitrate measurement and a second sulfate, nitrite, and/or nitrate measurement and transform the data into composition addition output instructions; and a composition delivery unit configured to receive and execute the composition addition output instructions from the controller.

In some aspects, the system further includes a first temperature sensor and a second temperature sensor in communication with the controller. The first temperature sensor is configured to measure a temperature of a process water supply line. The second temperature sensor is configured to measure a wet bulb temperature. Any sensor configured to measure wet bulb temperature can be utilized.

In some aspects, the system further includes a conductivity measurement device configured to measure conductivity of the process water.

A use of the system provided herein for treating process water of a cooling tower is also provided.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
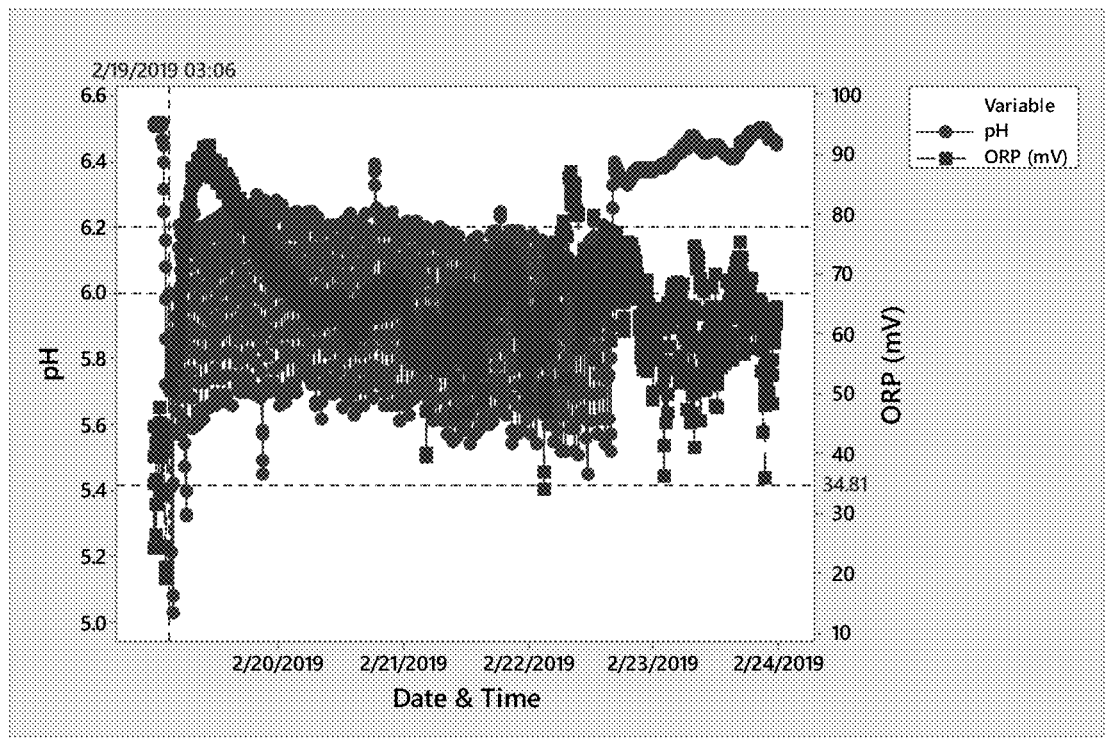
FIG. 1 shows a five-day trace of pH and oxidation reduction potential (ORP) data for 125 ppm sodium chlorate and hydrogen peroxide dosing.

The present disclosure relates to the discovery that dosing: 1) a chlorite, and/or 2) a chlorate with hydrogen peroxide, and/or a salt of a chlorite and/or chlorate, at a high rate over a brief period of time controls sulfur and/or nitrogen metabolizing bacteria in cooling systems. Typically, chemicals are dosed continuously at a lower rate but continuous dosing of chlorate and hydrogen peroxide and/or chlorite could not reduce caustic consumption in a cooling tower.

The dosing of a blend of a chlorate, such as sodium, potassium, and/or calcium chlorate, hydrogen peroxide, and stabilizer in a cooling water system, such as a geothermal cooling system, that has uncontrolled sulfur and/or nitrogen metabolizing bacteria activity has shown a significant reduction in the activity of the bacteria that lasts for a certain period. This led to a reduction in the amount of caustic required to maintain the desired pH of the cooling system.

Similarly, dosing a chlorite or chlorate, such as sodium, potassium, and/or calcium chlorite or chlorate, in a cooling water system, such as a geothermal cooling system, that has uncontrolled sulfur and/or nitrogen metabolizing bacteria activity has shown a significant reduction in the activity of the bacteria that lasts for a certain period. This led to a reduction in the amount of caustic required to maintain the desired pH of the cooling system.

In some embodiments, the chlorate and/or chlorite ions inhibit the microbial oxidation of ammonia to nitrite species, which are reducing in nature, and precursors for formation of nitrite and ammonia by other microorganisms.

In some embodiments, the process water/aqueous system is pretreated with a biocide, such as an oxidizing and/or a non-oxidizing biocide, before addition of the chlorate and/or chlorite.

In accordance with certain methods for reducing activity of a sulfur metabolizing bacteria provided by the present disclosure, a composition comprising an alkali metal salt of a chlorite and/or an alkali metal salt of a chlorate and hydrogen peroxide to process water of a cooling system and increasing a concentration of the composition from about 0 ppm to about 300 ppm in about 1 to about 100 minutes. The process water comprises the sulfur metabolizing bacteria.

A method of reducing activity of a nitrogen metabolizing bacteria is also provided. The method includes adding a composition comprising an alkali metal salt of a chlorite and/or an alkali metal salt of a chlorate and hydrogen peroxide to process water of a cooling system and increasing a concentration of the composition from about 0 ppm to about 300 ppm in about 1 to about 100 minutes. The process water comprises the nitrogen metabolizing bacteria.

The composition added to the process water includes an alkali metal salt of chlorate and/or chlorite. In some aspects, the alkali metal salt of chlorate is sodium chlorate and the alkali metal salt of chlorite is sodium chlorite.

The amount of the alkali metal salt of chlorate and/or chlorite in the composition can be from about 5% by weight to about 60% by weight. In some aspects, the amount of alkali metal salt of chlorate and/or chlorite in the composition is about 5% by weight, about 10% by weight, about 15% by weight, about 20% by weight, about 25% by weight, about 30% by weight, about 35% by weight, about 40% by weight, about 45% by weight, about 50% by weight, about 55% by weight, or about 60% by weight.

The composition added to the process water may include hydrogen peroxide, such as when the composition comprises a chlorate. The concentration of hydrogen peroxide in the composition can be from about 0% by weight to about 30% by weight, such as from about 0.5% by weight to about 25% by weight. In some aspects, the concentration of hydrogen peroxide in the composition is about 3% by weight, about 4% by weight, about 5% by weight, about 6% by weight, about 7% by weight, about 8% by weight, about 9% by weight, about 10% by weight, about 11% by weight, about 12% by weight, about 13% by weight, about 14% by weight, about 15% by weight, about 16% by weight, about 17% by weight, about 18% by weight, about 19% by weight, or about 20% by weight.

The composition can also include water and a stabilizer, for example.

In some aspects, the composition consists of sodium chlorate, hydrogen peroxide, and water. In some aspects, the composition consists of sodium chlorate, hydrogen peroxide, a stabilizer, and water.

In some aspects, the composition consists essentially of sodium chlorate, hydrogen peroxide, and water. In some aspects, the composition consists essentially of sodium chlorate, hydrogen peroxide, a stabilizer, and water.

In some aspects, the composition consists of sodium chlorite and water. In some aspects, the composition consists of sodium chlorite, a stabilizer, and water.

In some aspects, the composition consists essentially of sodium chlorite and water. In some aspects, the composition consists essentially of sodium chlorite, a stabilizer, and water.

In some aspects, the composition consists of sodium chlorate, sodium chlorite, hydrogen peroxide, and water. In some aspects, the composition consists of sodium chlorate, sodium chlorite, hydrogen peroxide, a stabilizer, and water.

In some aspects, the composition consists essentially of sodium chlorate, sodium chlorite, hydrogen peroxide, and water. In some aspects, the composition consists essentially of sodium chlorate, sodium chlorite, hydrogen peroxide, a stabilizer, and water.

To achieve the desired effect of controlling the sulfur and/or nitrogen metabolizing bacteria concentration and reducing caustic consumption, the composition is dosed at high levels over a short period of time. The concentration of the composition in the process water before adding the composition is zero. In some embodiments, the amount of composition added can be up to about 300 ppm, up to about 250 ppm, up to about 200 ppm, up to about 150 ppm, or up to about 100 ppm, for example. In some aspects, the amount of composition added can be about 5 ppm to about 300 ppm, about 10 ppm to about 250 ppm, about 25 ppm to about 200 ppm, about 50 ppm to about 150 ppm, or about 50 ppm to about 300 ppm.

The period of time from when the composition is initially added to when the concentration of the composition in the process water reaches about 100 ppm, about 150 ppm, about 200 ppm, about 250 ppm, or about 300 ppm is anytime from about 1 to about 100 minutes. In some aspects, the period of time is from about 1 minute to about 70 minutes, from about 1 minute to about 60 minutes, from about 1 minute to about 50 minutes, from about 1 minute to about 40 minutes, from about 1 minute to about 30 minutes, from about 1 minute to about 20 minutes, from about 1 minute to about 18 minutes, from about 1 minute to about 16 minutes, from about 1 minute to about 15 minutes, from about 1 minute to about 13 minutes, from about 1 minute to about 12 minutes, or from about 1 minute to about 10 minutes. In some aspects, the period of time is about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, or about 20 minutes. In some aspects, the concentration of the composition increases from about 0 ppm to about 300 ppm in less than about 15 minutes.

The method may include additional steps, such as decreasing the conductivity of the process water after adding the composition; decreasing a sulfate concentration in the process water after adding the composition; decreasing a nitrite and/or nitrate concentration in the process water after adding the composition; increasing a pH of the process water after adding the composition; or any combination thereof.

Another novel aspect of the present disclosure is the use of a difference in sulfate concentrations at different locations in the process water as a control variable for determining when to initiate dosing of the composition.

The method can include measuring a first sulfate concentration in the process water at a position at or near a bottom of a cooling tower basin. As used herein "at or near a bottom of a cooling tower basin" refers to a location in the portion of the basin containing process water within about 0.25-1.0 meter of the bottom of the basin.

The method also includes measuring a second sulfate concentration in the process water at a position at or near a surface of the process water. As used herein "at or near a surface of a cooling tower basin" refers to a location in the portion of the basin containing process water within about 5-10 cm of the surface of the process water in the basin.

A difference between the first and second sulfate concentrations can be determined. In some aspects, the difference between the concentrations is about 1 ppm, about 2 ppm, about 3 ppm, about 4 ppm, about 5 ppm, about 6 ppm, about 7 ppm, about 8 ppm, about 9 ppm, or about 10 ppm.

The difference can be calculated using a programmed logic controller (PLC). The PLC can be in electrical communication with a chemical dosing pump that initiates dosing of the composition once a pre-determined difference between the first and second sulfate concentrations has been reached.

In some aspects, the composition is added to the process water when the sulfate concentration difference is from about 3 to about 20 ppm. In some aspects, the composition is added to the process water when the sulfate concentration difference is from about 3 to about 7 ppm. In some aspects, the composition is added to the process water when the sulfate concentration difference is from about 4 to about 6 ppm.

Another novel aspect of the present disclosure is the use of a difference in nitrite concentrations as different locations in the process water as a control variable for determining when to initiate dosing of the composition.

The method can include measuring a first nitrite concentration in the process water at a position at or near a bottom of a cooling tower basin. As used herein "at or near a bottom of a cooling tower basin" refers to a location in the portion of the basin containing process water within about 0.25-1.0 meter of the bottom of the basin.

The method also includes measuring a second nitrite concentration in the process water at a position at or near a surface of the process water. As used herein "at or near a surface of a cooling tower basin" refers to a location in the portion of the basin containing process water within about 5-10 cm of the surface of the process water in the basin.

A difference between the first and second nitrite concentrations can be determined. In some aspects, the difference between the concentrations is about 1 ppm, about 2 ppm, about 3 ppm, about 4 ppm, about 5 ppm, about 6 ppm, about 7 ppm, about 8 ppm, about 9 ppm, or about 10 ppm.

The difference can be calculated using a PLC. The PLC can be in electrical communication with a chemical dosing pump that initiates dosing of the composition once a predetermined difference between the first and second nitrite concentrations has been reached.

In some aspects, the composition is added to the process water when the nitrite concentration difference is from about 3 to about 20 ppm. In some aspects, the composition is added to the process water when the nitrite concentration difference is from about 3 to about 7 ppm. In some aspects, the composition is added to the process water when the nitrite concentration difference is from about 4 to about 6 ppm.

While the foregoing method referred to first and second nitrite concentrations, the same methods can be carried out but first and second nitrate concentrations can be measured and the difference can be determined.

The methods described herein can be employed with any cooling system. In some aspects, the cooling system includes a direct contact condenser. In some aspects, the direct contact condenser utilizes geothermal make-up water. In some aspects, the cooling system comprises uncontrolled sulfur and/or nitrogen metabolizing bacteria activity before addition of the composition.

The methods disclosed herein may also be carried out in freshwater and/or seawater open recirculating cooling water systems, for example.

Process water that could particularly benefit from being treated using the methods disclosed herein is process water comprising sulfur oxidizing bacteria and sulfuric acid produced from the sulfur oxidizing bacteria or process water comprising nitrogen oxidizing bacteria and, for example, nitrites and/or nitrates produced from the nitrogen oxidizing bacteria.

Figure 10:
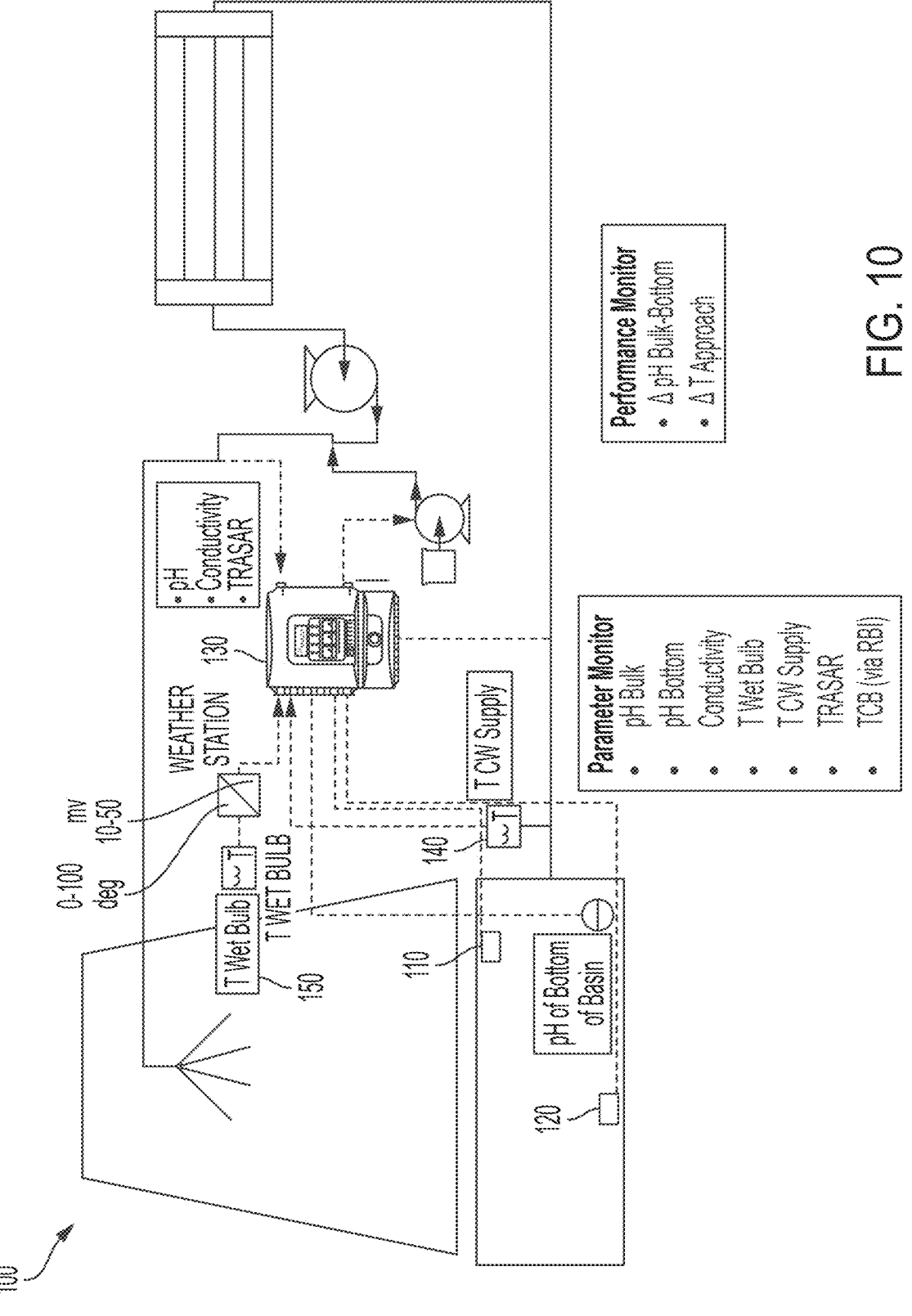
FIG. 10 shows an embodiment of a system for controlling bacteria.

A system for controlling sulfur deposition and sulfur oxidizing bacteria is also provided. FIG. 10 shows an embodiment of a system 100 for controlling sulfur oxidizing bacteria. The system 100 includes a controller 130 configured to receive data provided by a first sulfate measurement and a second sulfate measurement and transform the data into composition addition output instructions; and a composition delivery unit configured to receive and execute the composition addition output instructions from the controller. The first sulfate measurement could be determined from a sample collected from a first sulfate sensor 110. The second sulfate measurement could be determined from a sample collected from a second sulfate sensor 120.

The system of FIG. 10 may also be used for controlling nitrogen metabolizing bacteria. The system 100 includes a controller 130 configured to receive data provided by a first nitrite and/or nitrate measurement and a second nitrite and/or nitrate measurement and transform the data into composition addition output instructions; and a composition delivery unit configured to receive and execute the composition addition output instructions from the controller. The first nitrite and/or nitrate measurement could be determined from a sample collected from a first nitrite and/or nitrate sensor or test method, which could replace or be located near or adjacent to sensor 110. The second nitrite and/or nitrate measurement could be determined from a sample collected from a second nitrite and/or nitrate sensor, which could replace or be located near or adjacent to sensor 120.

In some aspects, the system further includes a first temperature sensor 140 and a second temperature sensor 150 in communication with the controller 130. The first temperature sensor 140 is configured to measure a temperature of a process water supply line. The second temperature sensor is configured to measure a wet bulb temperature 150. In certain aspects, the system may include a pH sensor. In the absence of a sulfate or nitrite measurement, changes in pH may act to trigger addition of the composition.

In some aspects, the system further includes a conductivity measurement device configured to measure conductivity of the process water.

A use of the system provided herein for treating process water of a cooling tower is also provided.

The present disclosure also describes an on-line unit and system for measuring, controlling, and/or optimizing one or more system parameters or properties of water. Optimization can include, for example, measuring one or more properties associated with the water to be sure that the one or more properties are within an acceptable, predetermined range and, if the one or more properties are not within the acceptable, predetermined range for each respective property being measured, causing a change in the water to bring the property back within the acceptable, predetermined range.

In certain embodiments, the system includes a monitoring and controlling unit that comprises a controller and a plurality of sensors. Each of the plurality of sensors can be in communication with the controller. For example, if the unit comprises five sensors, each of the five sensors can be in communication with the controller. In certain aspects, the controller can be attached to a skid, or other type of support member, to allow for mobility.

As used herein, the term "controller" refers to a manual operator or an electronic device having components, such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. For example, the controller may be programmed to prioritize system pH over conductivity, or vice versa. It should be appreciated that the object of such hierarchy logic is to allow improved control over the system parameters and to avoid circular control loops.

In some embodiments, the monitoring and controlling unit and method associated therewith includes an automated controller. In some embodiments, the controller is manual or semi-manual. For example, when the system includes one or more datasets received from various sensors in the system, the controller may either automatically determine which data points/datasets to further process or an operator may partially or fully make such a determination. A dataset for an industrial body of water, for instance, may include variables or system parameters such as oxidation/reduction potential (ORP), dissolved oxygen (DO), conductivity, pH, turbidity, concentrations of certain chemicals, such as biocides, scale inhibitors, friction reducers, acids, bases, and/or oxygen scavengers, levels of ions such as sulfate, nitrite, and/or nitrate (e.g., determined empirically, automatically, fluores- cently, electrochemically, colorimetrically, measured directly, calculated), temperature, pressure, flow rate, total dissolved or suspended solids, etc. Such system parameters are typically measured with any type of suitable data cap- turing equipment, such as sensors designed specifically for these parameters, e.g., pH sensors, ion analyzers, tempera- ture sensors, thermocouples, pressure sensors, corrosion probes, and/or any other suitable device or sensor. Data capturing equipment is in communication with the controller and, according to some embodiments, may have advanced functions (including any part of the control algorithms described herein) imparted by the controller.

The monitoring and controlling unit may comprise a plurality of sensors, which are capable of analyzing the water and transmitting data regarding the water to the controller. The plurality of sensors can comprise, for example, sensors for measuring conductivity, pH, ORP, biocide concentration, turbidity, temperature, flow, sulfate levels, nitrite levels, nitrate levels, and DO in the water. The monitoring and controlling unit may comprise any of these sensors, all of these sensors, a combination of two or more of these sensors, one or more additional sensors not specifi- cally mentioned here, and the sensors may be in communi- cation with the controller. Other types of sensors contem- plated by the present disclosure include, but are not limited to, oil in water sensors, total dissolved solids sensors, and total suspended solids sensors.

The presently disclosed monitoring and controlling sys- tem comprises, in certain embodiments, one or more chemi- cal injection pumps. Each chemical injection pump may be in fluid communication with a storage device. Each storage device may comprise one or more chemicals and the chemi- cal injection pumps may transport those chemicals into the body of water. In some embodiments, the chemical injection pump comprises the storage device. The chemical injection pumps may be in communication with the controller in any number of ways, such as through any combination of wired connection, a wireless connection, electronically, cellularly, through infrared, satellite, or according to any other types of communication networks, topologies, protocols, standards and more. Accordingly, the controller can send signals to the pumps to control their chemical feed rates.

In certain embodiments, the monitoring and controlling system is implemented to have the plurality of sensors provide continuous or intermittent feedback, feed-forward, and/or predictive information to the controller, which can relay this information to a relay device, such as the Nalco Global Gateway, which can transmit the information via cellular communications to a remote device, such as a cellular telephone, computer, and/or any other device that can receive cellular communications. This remote device can interpret the information and automatically send a signal (e.g., electronic instructions) back, through the relay device, to the controller to cause the controller to make certain adjustments to the output of the pumps. The information can also be processed internally by the controller and the con- troller can automatically send signals to the pumps to adjust the amount of chemical injection, for example. Based upon the information received by the controller from the plurality of sensors or from the remote device, the controller may transmit signals to the various pumps to make automatic, real-time adjustments, to the amount of chemical that the pumps are injecting into the water.

Alternatively, an operator of the remote device that receives cellular communications from the controller can manually manipulate the pumps through the remote device. The operator may communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemi- cal being added to the water by one or more of the injection pumps, or any combination of the foregoing. The controller and/or the remote device is also capable of making any of the foregoing adjustments or modifications automatically without the operator actually sending or inputting any instructions. Preset parameters or programs are entered into the controller or remote device so that the controller or remote device can determine if a measured property is outside of an acceptable range. Based on the information received by the plurality of sensors, the controller or remote device can make appropriate adjustments to the pumps or send out an appropriate alert.

In certain embodiments, the remote device or controller can include appropriate software to receive data from the plurality of sensors and determine if the data indicates that one or more measured properties of the water are within, or outside, an acceptable range. The software can also allow the controller or remote device to determine appropriate actions that should be taken to remedy the property that is outside of the acceptable range. For example, if the measured pH is above the acceptable range, the software allows the control- ler or remote device to make this determination and take remedial action, such as alerting a pump to increase the flow of an acid into the body of water.

The monitoring and controlling system and/or controller disclosed herein can incorporate programming logic to con- vert analyzer signals from the plurality of sensors to pump adjustment logic and, in certain embodiments, control one or more of a plurality of chemical injection pumps with a unique basis. Non-limiting, illustrative examples of the types of chemical injection pumps that can be manipulated include chemical injection pumps responsible for injecting biocides, scale inhibitors, friction reducers, acids, bases, sulfites, oxygen scavengers, and any other type of chemical that could prove to be useful in the particular aqueous industrial system. Particular examples of biocides, scale inhibitors, friction reducers, acids, bases, sulfites, and oxygen scavengers are all well-known in the art and all examples of such chemicals are within the scope of the present disclosure.

The sensors disclosed herein are operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable range for that property.

The method is optionally repeated for a plurality of different system parameters, where each different system parameter has a unique associated property, or, alternatively, all system parameters can be analyzed concurrently by the plurality of sensors.

Data transmission of measured parameters or signals to chemical pumps, alarms, remote monitoring devices, such as computers or cellular telephones, or other system components is accomplished using any suitable device, and across any number of wired and/or wireless networks, including as examples, WiFi, WiMAX, Ethernet, cable, digital subscriber line, BLUETOOTH®, cellular technologies (e.g., 2G, 3G, 4G, 5G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, BLUETOOTH®, optical, infrared, radiofrequency, etc.), universal serial bus, telephone network, the like, and combinations of such interfaces/connections may be used.

As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

In some embodiments, system parameter information is received from the system and archived. In certain embodiments, system parameter information is processed according to a timetable or schedule. In some embodiments, system parameter information is immediately processed in real-time or substantially real-time. Such real-time reception may include, for example, "streaming data" over a computer network.

The chemicals to be added to the system, such as the acids, bases, biocides, scale inhibitors, dispersants, friction reducers, etc., may be introduced to the system using any suitable type of chemical dosing or injection pump. Most commonly, positive displacement injection pumps are used and are powered either electrically or pneumatically. Continuous flow injection pumps can also be used to ensure specialty chemicals are adequately and accurately injected into the rapidly moving process stream. Though any suitable pump or delivery system may be used, exemplary pumps and pumping methods include those disclosed in U.S. Pat. No. 5,066,199, titled "Method for Injecting Treatment Chemicals Using a Constant Flow Positive Displacement Pumping Apparatus" and U.S. Pat. No. 5,195,879, titled "Improved Method for Injecting Treatment Chemicals Using a Constant Flow Positive Displacement Pumping Apparatus," each incorporated herein by reference in its entirety.

In some embodiments, changes in the chemical injection pumps are limited in frequency. In some aspects, adjustment limits are set at a maximum of 1 per 15 min and sequential adjustments in the same direction may not exceed 8, for example. In some embodiments, after 8 total adjustments or a change of 50% or 100%, the pump could be suspended for an amount of time (e.g., 2 or 4 hours) and alarm could be triggered. If such a situation is encountered, it is advantageous to trigger an alarm to alert an operator. Other limits, such as maximum pump output, may also be implemented. It should be appreciated that it is within the scope of the invention to cause any number of adjustments in any direction without limitation. Such limits are applied as determined by the operator or as preset into the controller.

In accordance with certain embodiments of the present disclosure, a method of monitoring and controlling sulfur and/or nitrogen metabolizing bacteria in an aqueous industrial system is provided. The monitored properties can be, for example, pH, conductivity, turbidity, flow, biocide concentration, sulfate concentration, nitrate concentration, and/or nitrite concentration.

The method includes the use of a monitoring and controlling unit comprising a controller and a plurality of sensors in communication with the controller. Each of the plurality of sensors is operable to measure a property of the water. For example, in some embodiments, the unit comprises eight sensors, wherein each sensor is operable to measure a different property, such as pH, temperature, flow, conductivity, sulfate concentration, nitrite concentration, nitrate concentration, and turbidity.

One or more pumps, which are in communication with the controller, are utilized to inject various chemicals into the water, such as the composition disclosed herein, caustic, or other additives. Each chemical may have its own chemical injection pump.

An acceptable range for each of the one or more properties of the water to be measured is entered into the controller.

A conduit may be provided between the aqueous industrial system and the monitoring and controlling unit. A sample of water passes through the conduit and into an inlet of the monitoring and controlling unit. Next, one or more properties of the water are measured using a plurality of sensors and the controller determines if the measured one or more properties are within the acceptable range entered into the controller in the previous step. This determining step can be automatically performed by the controller and in this step, the measured value for each measured property is compared to the acceptable range entered for that specific property.

If the measured one or more properties are outside of the acceptable range associated with that property, the controller and/or operator of the controller may cause a change, for example, in an influx of a chemical into the aqueous industrial system from the one or more chemical injection pumps, the chemical(s) being capable of adjusting the measured property and bringing it back within the acceptable range. The controller is operable to determine when the measured property is back within the acceptable range and subsequently turn off the chemical injection pump(s).

In some aspects, the system monitors the effectiveness of the sulfur and/or nitrogen metabolizing bacteria and sulfur deposition control by monitoring the selected parameters, such as turbidity, sulfate concentration, nitrite concentration, nitrate concentration, and scale dispersant concentration, online.

An alternative to measuring a sulfate, nitrate, and/or nitrite difference as described herein is to measure a pH difference. The pH difference is determined from the pH between the bottom of the basin and bulk cooling water. Without being bound by any particular theory, the higher activity of sulfur oxidizing bacteria, the higher concentration of $H_2SO_4$ in the bottom of the basin, and the lower pH will be. The pH difference can be about 1, about 2, or about 3 pH units.

The methods and systems described herein have several advantages: improved sulfur and/or nitrogen metabolizing bacteria control; lower sulfur deposition and/or nitrogen conversion rate; lower NaOH consumption; higher cooling tower performance; and higher plant efficiency and lower total cost of operation.

The compositions and methods disclosed herein are useful in numerous applications that require microbiological control or disinfection, such as in cooling water, disinfection, food and beverage, pulp and paper, manufacturing, potable water, secondary disinfection, etc. The methods and compositions are applicable to any process or utility aqueous system and/or water system where microorganisms are known to grow. Examples of process water systems include, but are not limited to, flume water, geothermal water, shower water, washers, thermal processing waters, brewing, fermentation, clean-in-place, hard surface sanitization, ethanol/biofuels process waters, pretreatment and utility waters, membrane systems, ion-exchange beds, water used in the process/manufacture of paper, ceiling tiles, fiber board, microelectronics, e-coat or electrodeposition applications, process cleaning, oil exploration and energy services, completion and workover fluids, drilling additive fluids, fracturing fluids, flood waters, oil and gas wells/flowlines, gas systems, and any combination thereof.

EXAMPLES

These trials were replicated in other sites to establish if positive results will also be observed. In the Philippines, the rapid dosing of a composition of sodium chlorate and hydrogen peroxide (about 40% by weight sodium chlorate and about 8% by weight of hydrogen peroxide; composition 1) resulted in around 45% caustic reduction. In Indonesia, the caustic reduction was around 40%. It was also found out that during sulfur oxidizing bacteria proliferation, there is a significant pH difference between the surface and bottom of the basin. After dosing the composition, the pH difference approached zero. The automation technology behind the right timing of composition dosing can depend on the pH difference at these two points (surface and bottom) usually at a difference of about 0.9-1.5.

The dosing regimen for the trial was as follows: 1st dosing—125 ppm, 2nd dosing—150 ppm, 3rd dosing—100 ppm, and 4th dosing—75 ppm. For the first dosing (125 ppm), the feeding of the caustic was done manually and later automated after six days. FIG. 1 shows a sharp rise and fall behavior in pH primarily due to manual caustic feeding. In the case of this particular cooling tower, caustic feeding cannot be eliminated because of the inherent acidic condensate.

Figure 2:
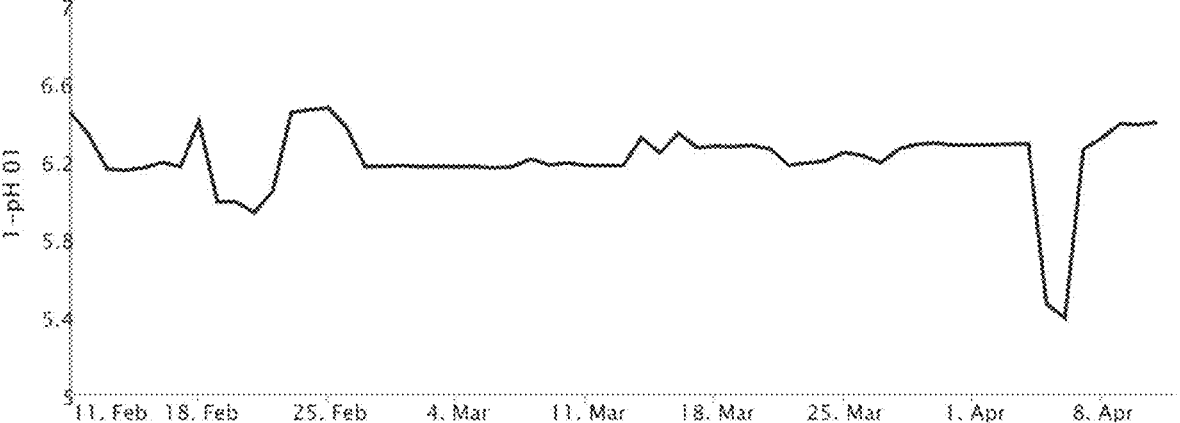
FIG. 2 shows pH data from an installed 3D TRASAR™ unit, a registered mark of Ecolab USA Inc.
Figure 3:
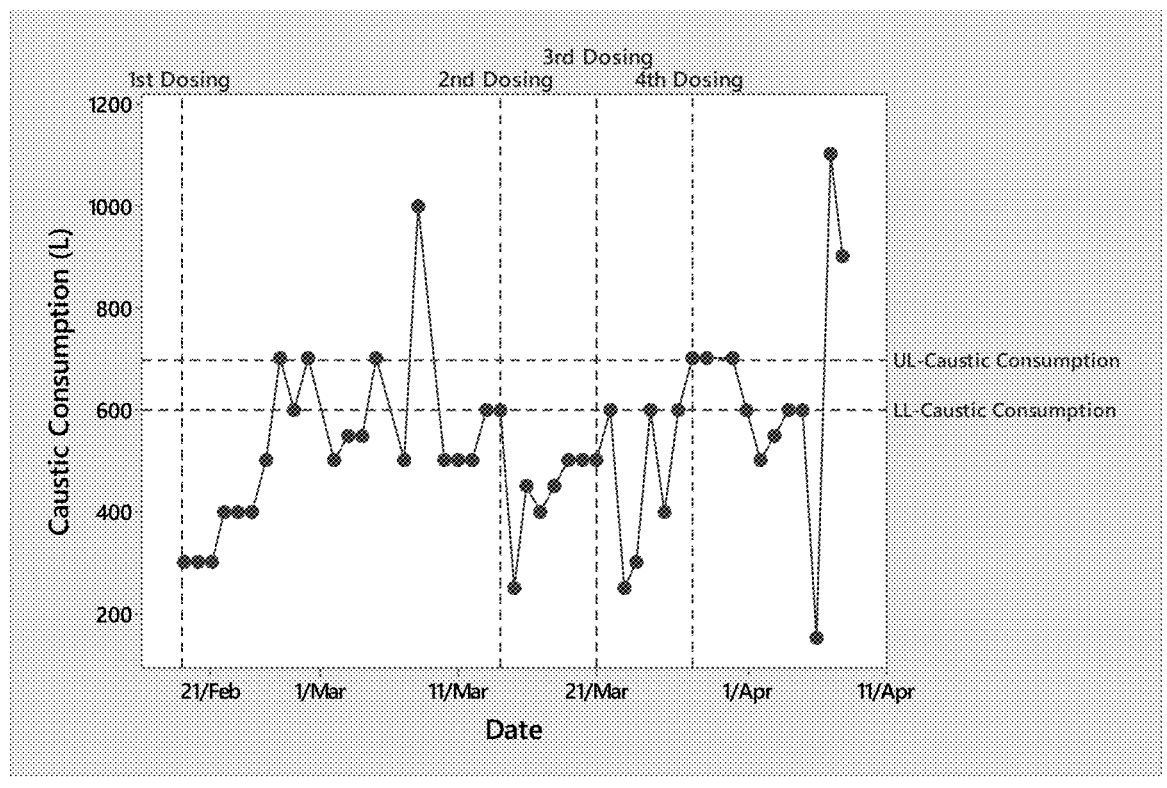
FIG. 3 shows NaOH consumption during the trial.

Generally, the pH of the system, as shown in FIG. 2, was maintained at the desired values during the trial and the corresponding caustic consumption was plotted (see FIG. 3).

Figure 4:
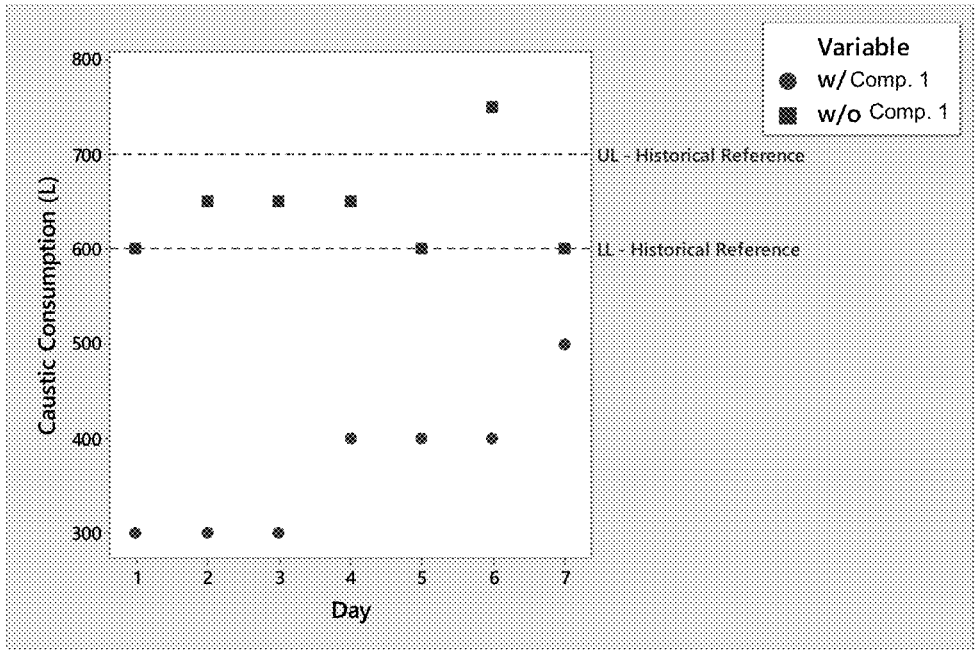
FIG. 4 shows a projected 7-day NaOH consumption with and without dosing a composition comprising chlorate and hydrogen peroxide.
Figure 5:
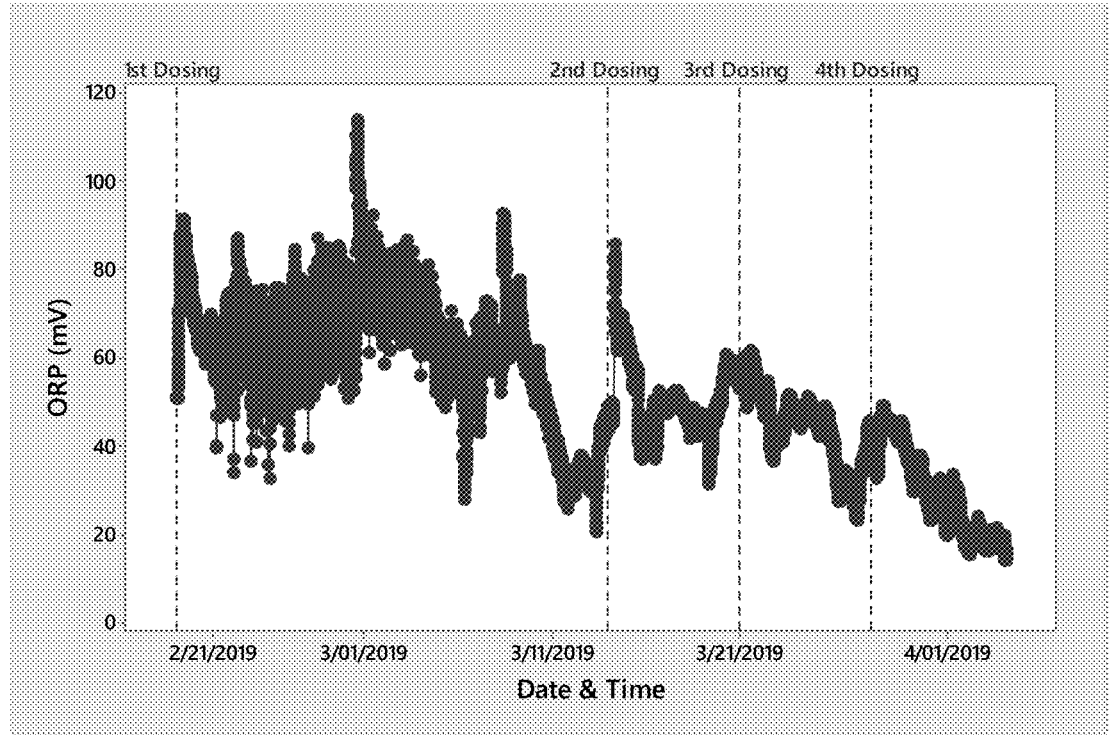
FIG. 5 shows ORP levels at different dosing levels.

A reduction in the caustic consumption was observed after each dosing which gradually steps up as the bacteria starts to proliferate again prompting conversion of $H_2S$ into sulfuric acid. From a projected 5-day caustic consumption plot (see FIG. 4), it can be noted that the treatment program can reduce caustic consumption by up to about 42% (at about 125 and about 150 ppm).

In FIG. 1, initial composition dosing showed a spike in ORP after about 9 hours. This shows that the level of oxidant in the system increased. Similar spikes in ORP after each dosing were also observed for other target concentrations.

Figure 6:
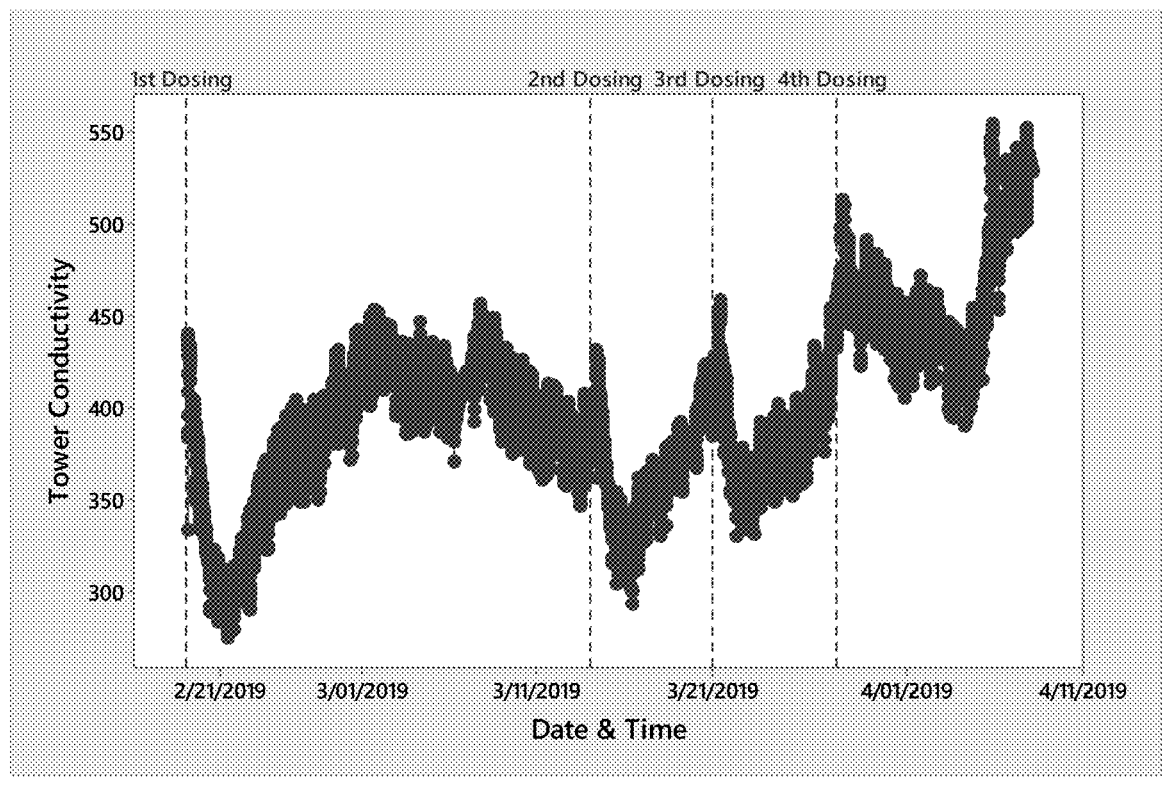
FIG. 6 shows conductivity readings from 3D TRASAR™, a registered mark of Ecolab USA Inc., after each dosing.

Bacterial activity as monitored by conductivity (related to sulfate reduction) showed a decreasing trend after each dosing that demonstrated the ability of the product to reduce sulfur oxidizing bacteria action (see FIG. 6).

It can be observed that at high dosing levels (150 ppm and 125 ppm), the reduction in conductivity levels was also high in comparison to 100 and 75 ppm. The expected trend was also observed for the 2nd to 4th dosing even if there are still residual chemicals from the current CT program that may suggest compatibility with existing non-oxidizing biocide treatment.

The total bacterial count (TBC) was also gathered during the trial and the counts were maintained at about $1 \times 10^3$ which is within the acceptable bacterial counts for cooling towers. This could indicate that the composition disclosed herein does not affect the general bacterial population but selectively affects the metabolism of certain types of microorganisms.

The trial was able to demonstrate the positive effects of the composition in the system. The activity of sulfur oxidizing bacteria was managed as shown in the conductivity and sulfate trends. With this, pH depression in relation to sulfuric acid production from these sulfur oxidizing bacteria was addressed. The observed effects on conductivity for 150 and 125 ppm dosing levels did not show much difference. The treatment program was able to reduce the caustic consumption by up to about 42%. Expected trends on ORP and conductivity were also observed even in conjunction with the existing treatment program (non-oxidizing) which may suggest compatibility.

Figure 7:
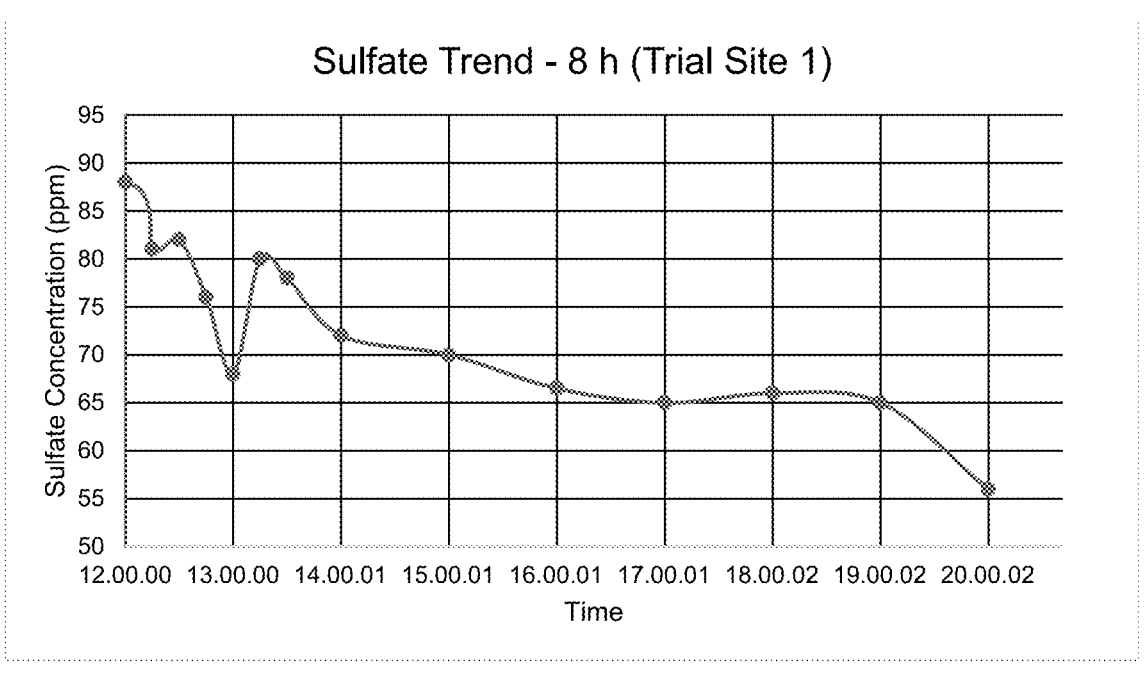
FIG. 7 shows sulfate concentrations over time at trial site 1.
Figure 8:
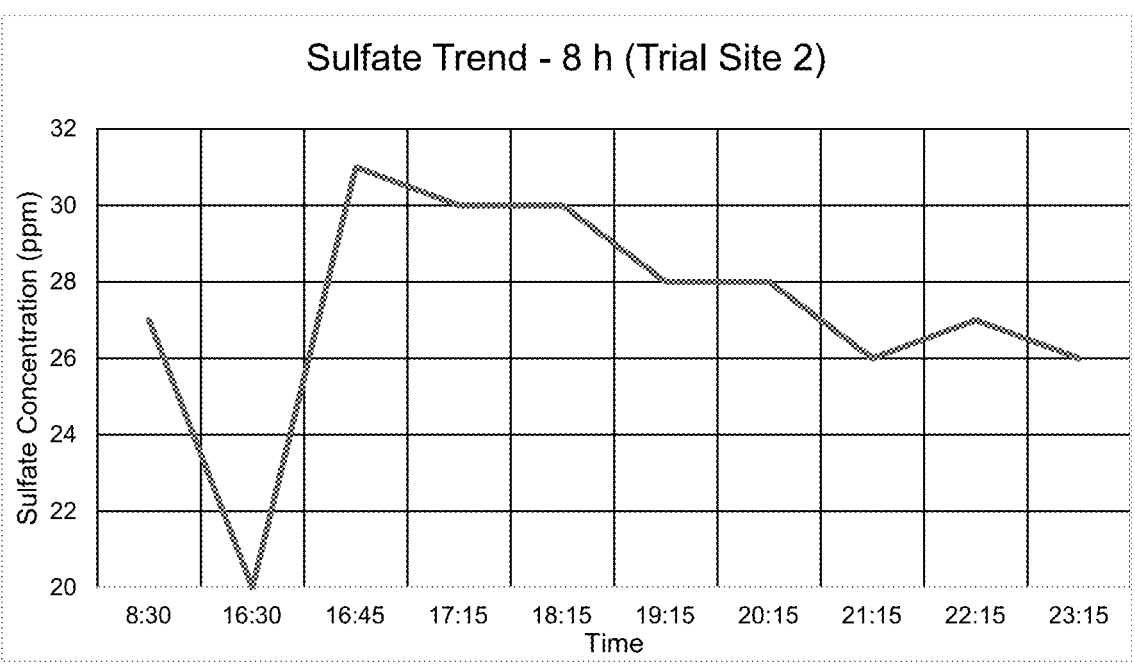
FIG. 8 shows sulfate concentrations over time at trial site 2.

Two trials were done to evaluate the performance of the composition in Indonesia. Both trial sites exhibited a reduction in bacterial activity as shown in the sulfate graphs FIG. 7 and FIG. 8.

Figure 9:
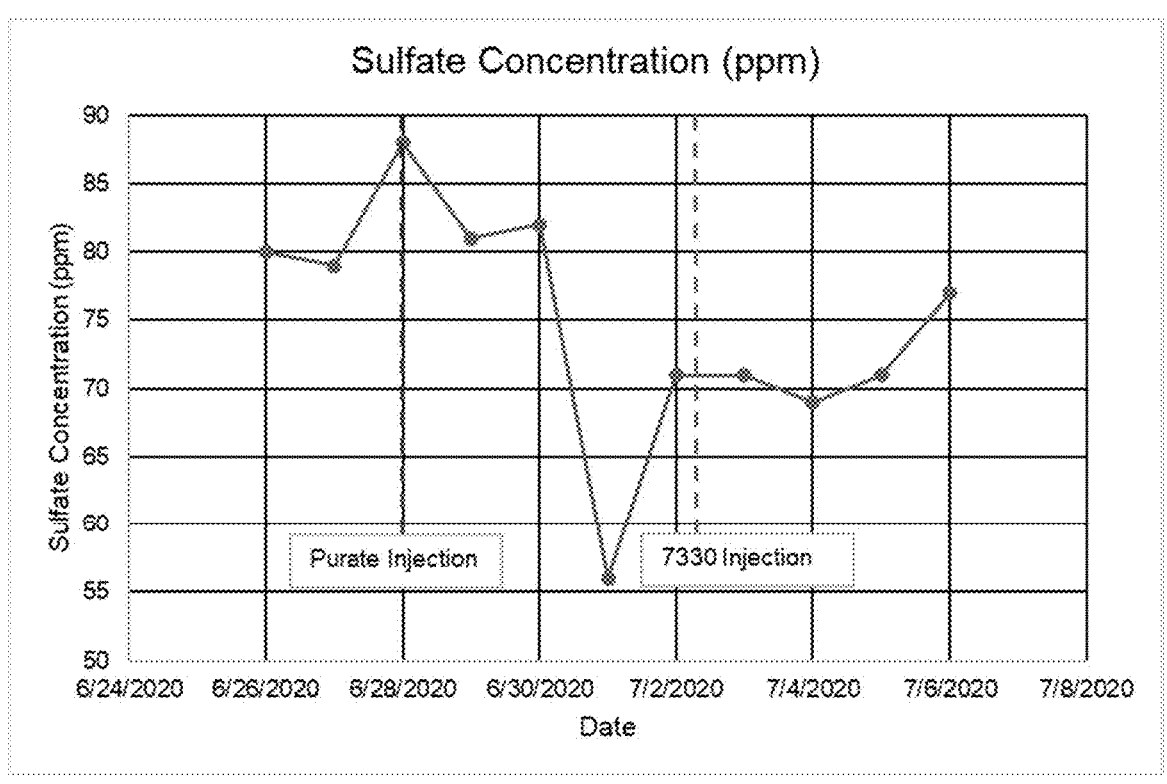
FIG. 9 shows sulfate concentration responses after addition of compositions.

For both trials, the caustic reduction was observed at about 34% and about 25%, respectively. Aside from this reduction, better sulfur oxidizing bacteria management was observed in tandem with the existing non-oxidizing biocide. The bacterial activity was lower with the composition dosing compared to non-oxidizing biocide alone (FIG. 9).

During the trial, it was also observed that as sulfur oxidizing bacteria proliferate in the system, the pH of the surface of the basin and bottom of the basin has a difference of 0.9-1.5. Upon dosing of a composition of sodium chlorate and hydrogen peroxide (about 40% by weight sodium chlorate and about 8% by weight of hydrogen peroxide), this differential pH narrowed down and reached a point that the difference was less than or equal to 0.5. Based on the previous results, the effect of a composition of sodium chlorate and hydrogen peroxide (about 40% by weight sodium chlorate and about 8% by weight of hydrogen peroxide) on the system was greatly observed when the prevailing sulfate level is high, meaning there is high bacterial activity. As the sulfate level increases in the system, the greater the pH difference is. With this, the observation of pH differences can properly identify the best condition to dose the composition.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a sensor" is intended to include "at least one sensor" or "one or more sensors."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

16

What is claimed is:

1. A method of reducing activity of a bacteria, comprising:
adding a composition comprising an alkali metal salt of a chlorite and/or an alkali metal salt of a chlorate and hydrogen peroxide to a process water of a cooling system, the process water comprising the bacteria;
increasing a concentration of the composition in the process water from about 0 ppm up to about 300 ppm in about 1 minute to about 100 minutes;
measuring a first sulfate concentration in the process water at a position at or near a bottom of a cooling tower basin;
measuring a second sulfate concentration in the process water at a position at or near a surface of the process water;
calculating a sulfate concentration difference between the first sulfate concentration and the second sulfate concentration; and
adding the composition to the process water when the sulfate concentration difference reaches a predetermined value.

2. The method of claim 1, wherein the bacteria is selected from the group consisting of sulfur metabolizing bacteria, nitrogen metabolizing bacteria, and any combination thereof.

3. The method of claim 1, wherein the concentration of the composition in the process water increases from about 0 ppm up to about 300 ppm in about 1 minute to about 15 minutes.

4. The method of claim 1, wherein the concentration of the composition in the process water is increased from about 0 ppm up to about 150 ppm.

5. The method of claim 1, further comprising decreasing a conductivity of the process water after adding the composition.

6. The method of claim 1, further comprising decreasing a sulfate, a nitrite, and/or a nitrate concentration in the process water after adding the composition.

7. The method of claim 1, further comprising increasing a pH of the process water after adding the composition.

8. The method of claim 1, wherein the composition is added to the process water when the sulfate concentration difference is from about 3 to about 20 ppm.

9. The method of claim 1, wherein the composition comprises about 5 wt % to about 60 wt % of the alkali metal salt of chlorite and/or chlorate and about 0 wt % to about 30 wt % of the hydrogen peroxide.

10. The method of claim 1, wherein the cooling system includes a direct contact condenser.

11. A method of reducing activity of a bacteria, comprising:
adding a composition comprising an alkali metal salt of a chlorite and/or an alkali metal salt of a chlorate and hydrogen peroxide to a process water of a cooling system, the process water comprising the bacteria;
increasing a concentration of the composition in the process water from about 0 ppm up to about 300 ppm in about 1 minute to about 100 minutes;
measuring a first nitrite and/or nitrate concentration in the process water at a position at or near a bottom of a cooling tower basin;
measuring a second nitrite and/or nitrate concentration in the process water at a position at or near a surface of the process water;
calculating a nitrite and/or nitrate concentration difference between the first nitrite and/or nitrate concentration and the second nitrite and/or nitrate concentration; and adding the composition to the process water when the
nitrite and/or nitrate concentration difference reaches a
predetermined value.

12. The method of claim 11, wherein the composition is
added to the process water when the nitrite and/or nitrate
concentration difference is from about 3 ppm to about 20
ppm.

\* \* \* \* \*